Aug. 15, 1933.  A. B. SCHEIBNER  1,922,398
CHRISTMAS GARDEN HEDGE
Filed Sept. 7, 1932

Aaron B. Scheibner INVENTOR
BY Victor J. Evans & Co
ATTORNEYS

Patented Aug. 15, 1933

1,922,398

UNITED STATES PATENT OFFICE 1,922,398

CHRISTMAS GARDEN HEDGE

Aaron B. Scheibner, Audubon, N. J.

Application September 7, 1932
Serial No. 632,071

2 Claims. (Cl. 41—10)

The present invention relates to an improved artificial hedge for Christmas tree gardens, and it is the purpose of the invention to provide an improved article of manufacture composed of pine tree cones, which article is made by subjecting the cones to heat in order to open up the petals, after having previously cut off the cones at opposite portions to cause flat faces to be formed, and then adhesively fastening the flat faces together and mounting a series of cones on a base strip. The hedge may be formed in sections, which can be placed in alignment with each other, in order to construct a hedge of the desired length, each section of the hedge having been subsequently dipped in green coloring matter.

It is to be understood that the particulars herein given are in no way limitive, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:—

Figure 1:
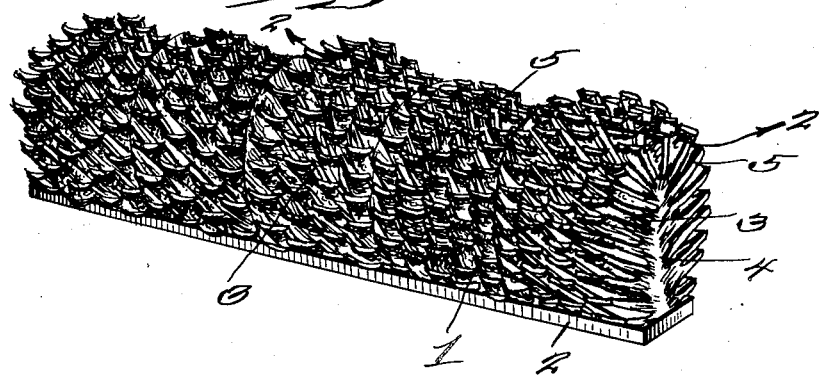
Figure 1 is a view in side elevation of a section of hedge constructed in accordance with the invention.
Figure 2:
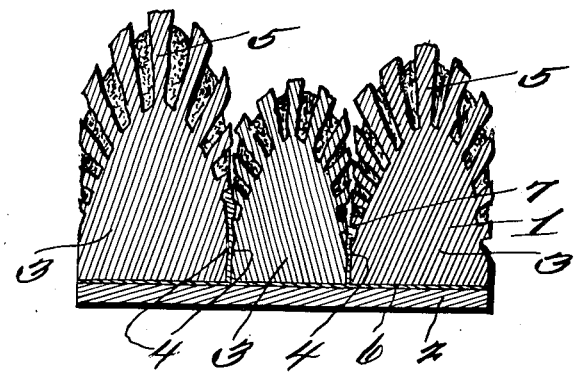
Figure 2 is a longitudinal sectional view through the same.

Referring to the drawing 1 identifies a section of hedge as a whole, which comprises a base strip 2 and a plurality of pine cones 3.

In constructing each hedge section the pine cones are first provided with flat faces 4, which are caused to be formed by sawing off opposite portions of each cone. The cones are then subjected to heat by placing them in an oven, which will cause the petals 5 to open up, or rather spread apart.

The cones are then adhesively mounted upon the base strip 2, the adhesive connections being identified at 6, and when mounted on the base strip, the flat faces are adhesively connected as shown at 7. Subsequently the entire hedge section may then be dipped in any suitable green coloring matter, such as will permit the hedge section to simulate a natural hedge.

Figure 3:
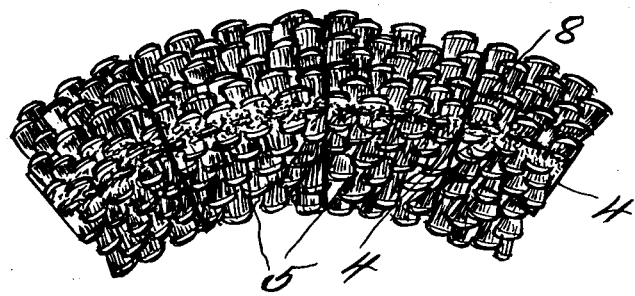
Figure 3 is a plan view of a modified construction of a hedge section.

It is obvious that the cones may have the flat faces arranged on angles, such as shown in the plan view in Figure 3, and in this instance the cones may be mounted on a base strip which is curved as shown in dotted lines 8.

The invention having been set forth, what is claimed is:

1. In a method for constructing a Christmas tree garden hedge, the steps consisting in sawing off opposite portions of pine tree cones, causing opposite flat faces to be formed on the cones, then subjecting the cones to heat causing the petals to open, adhesively fastening the flat faces together and adhesively mounting the cones on an elongated base strip, and then finally dipping the hedge section into suitable coloring matter.

2. A Christmas tree garden hedge section, comprising a base strip, a plurality of open petal cones adhesively mounted on the base strip, said cones having opposite flat faces being adhesively fastened together, the hedge section having a coloring matter applied.

AARON B. SCHEIBNER.